May 26, 1959 J. G. ATWOOD 2,888,623
MECHANICALLY DAMPED SERVOMOTOR SYSTEM
Filed March 4, 1958 3 Sheets-Sheet 1

INVENTOR.
JOHN G. ATWOOD
BY
ATTORNEY

May 26, 1959 J. G. ATWOOD 2,888,623
MECHANICALLY DAMPED SERVOMOTOR SYSTEM
Filed March 4, 1958 3 Sheets-Sheet 2

INVENTOR
JOHN G. ATWOOD

May 26, 1959    J. G. ATWOOD    2,888,623
MECHANICALLY DAMPED SERVOMOTOR SYSTEM
Filed March 4, 1958    3 Sheets-Sheet 3

INVENTOR.
JOHN G. ATWOOD
BY
ATTORNEY

United States Patent Office 2,888,623
Patented May 26, 1959

2,888,623

MECHANICALLY DAMPED SERVOMOTOR SYSTEM

John G. Atwood, Redding, Conn., assignor to The Perkin-Elmer Corporation, Norwalk, Conn., a corporation of New York Application March 4, 1958, Serial No. 719,166

10 Claims. (Cl. 318—448)

The present invention pertains to servomechanisms and is of particular advantage when used in a closed electromechanical servomechanism loop in order to minimize unwanted oscillation of the mechanical portion of the loop.

In many electromechanical servomechanisms, it is desirable to have some motion of the mechanical portion of the system (usually oscillatory) at all times in order to overcome static friction which inheres in bearings, cams and other mechanical linkages.

In some servomechanism systems, the small amount of motion which is required to overcome static friction is not an objectionable condition and can be tolerated. In other servomechanism systems, however, such as those used to record data, it is not desirable to have such motion of the mechanical portion of the system recorded because it constitutes an error which is not truly part of the information contained in the signal transmitted by the servomechanism loop.

It is the object of the present invention to minimize such oscillatory motion in an electromechanical servomechanism.

An ancillary object of the present invention is to localize the suppression of such motion in a portion of the system where it is not desirable.

The present invention does not, however, altogether eliminate such motion throughout the entire system and, therefore, sufficient movement is still present to overcome inertia, static friction and similar effects.

Another object of the present invention is to make it feasible to use less expensive components in an electromechanical servomechanism loop, particularly servomotors such as are usually found in recording systems, without sacrificing the accuracy and quality of recorded data and still attaining desired response characteristics.

The present invention conceives of operably connecting an additional member to the mechanical portion of the servomechanism system at a point where it is desirable to eliminate the motion. The mechanical member possesses particular characteristics dependent upon frequency of the motion which is to be suppressed. When properly designed and incorporated in an electromechanical servomechanism loop as taught by the present invention, the additional mechanical member suppresses and virtually eliminates movement of that particular part of the system to which it is affixed, but at the same time permits movement of the other portions of the system so as to keep the system free to respond to signal information without having to overcome static friction or other inertial effects. The operational features and advantages of the present invention will appear more fully from an understanding of a typical embodiment as disclosed in the drawings.

Fig. 3 is a perspective view of an optical attenuator and associated recorder drive means which includes the damping assembly of the present invention;

Figure 1:
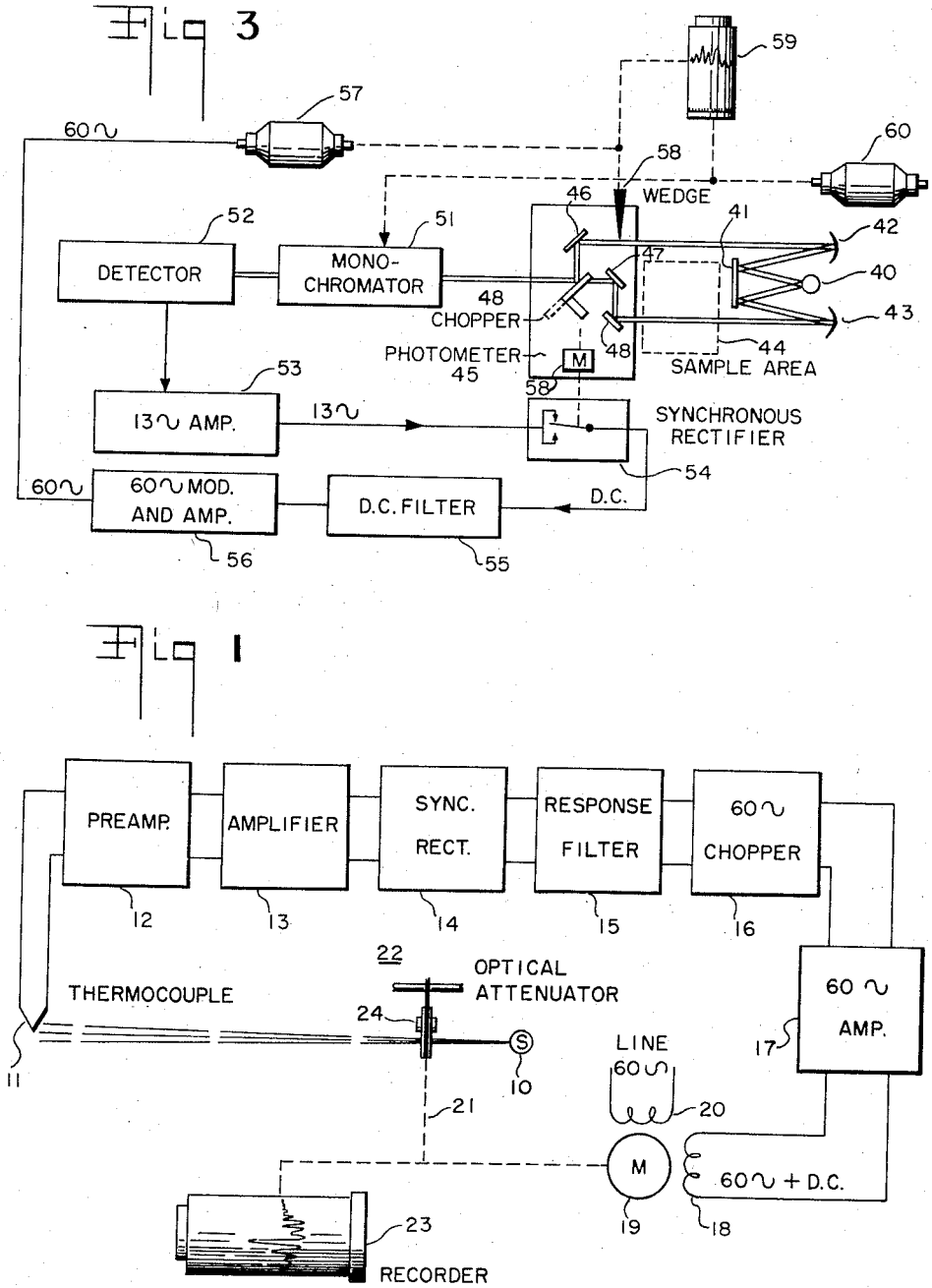
Fig. 1 is a schematic diagram of an electromechanical servomechanism loop embodying the present invention.

The present invention is not limited to use in optical system recorder servomechanism loops, but its embodiment in such a system will be used to explain a typical and practical application. The servomechanism loop illustrated in Fig. 1 is part of a spectrophotometer. In spectrophotometric instruments, the null principle is usually employed, the instrument producing an error signal which is commensurate with the instantaneous deviation from a desired state of balance in the servomechanism loop. The system, of course, may be made to operate so as to produce an error signal which is indicative of the deviation from any other desired closed loop conditions. The present invention may be advantageously used, however, in any electromechanical system where there is unwanted movement of a mechanical member at a known or determinable frequency.

In Fig. 1, a source of infrared energy or other comparable radiation is shown at 10. The infrared energy is beamed to a thermocouple 11 which produces an electrical signal commensurate with the instantaneous energy impinging thereon. A preamplifier 12 and amplifier 13 amplifies the signal which, in a typical instance, may contain an A.C. component indicative of the information desired.

A synchronous rectifier 14 may be employed to produce a D.C. signal proportional to the A.C. component and a response filter 15 filters all extraneous signals except that desired. A chopper 16 is connected to receive the filtered D.C. signal and produces a 60-cycle output having an amplitude commensurate with the amplitude of the D.C. input signal and a phase commensurate with the polarity of the D.C. input signal. A 60-cycle amplifier 17 receives the output signal of the chopper 16 and amplifies that signal to energize a winding 18 of a servomotor 19. The other winding 20 of the motor 19 is synchronously energized by the same 60-cycle source which operates the chopper 16. The servomotor 19 thus responds by rotating in a direction and to an extent commensurate with the amplitude and phase, respectively, of the input signal developed across winding 18. Appropriate mechanical linkage 21 connecting the servomotor 19 with the optical attenuator 22 is arranged to drive the optical attenuator 22 to maintain the desired closed loop condition which has been established for the system. The motor 19 also actuates a recorder 23 and records the amplitude and sense of its movement which is necessary to maintain that desired condition.

It may be appreciated by those skilled in the art that a certain amount of undesired movement of the rotor of motor 19 at 60 cycles is caused by the fact that, while one phase winding is energized with 60-cycle power, direct current flows at all times through the control phase winding. This undesired movement is transmitted through the mechanical linkage 21 to the optical attenuator 22 and similarly is transmitted to the recorder 23. Obviously, it is not desirable to have such 60-cycle oscillatory movement recorded as part of the informational signal, but the D.C. current flow through the control winding 18 is necessary to attain adequate motor response. The damping assembly of the present invention is thus affixed to that portion of the servomechanism loop which mechanically drives the optical attenuator and recorder.

Figure 2:
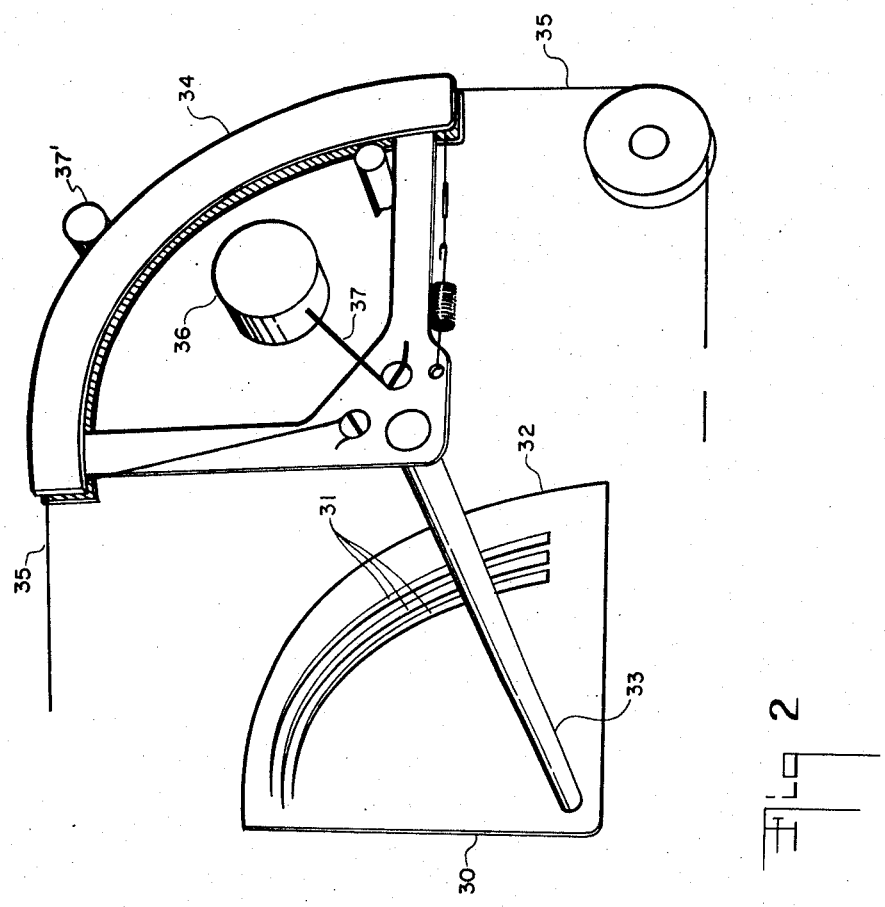
Fig. 2 is a schematic diagram of a spectrophotometer, the recording servomechanism loop of which includes an embodiment of the present invention.

An embodiment of the device of the present invention is schematically indicated at 24 in Fig. 1 and the optical attenuator assembly is shown in more detail in Fig. 2. The optical attenuator assembly 30 comprises a number of tapered slits 31 in an optically opaque quadrant 32. The shaft 33 is also affixed to a drive quadrant 34. The attenuator 30 is rotatably driven about shaft 33 by the servomotor 19 of Fig. 1 through appropriate mechanical linkage, such as the friction drive 37' which operates on the periphery of drive quadrant 34. Thus, the optical attenuator 30 and the drive quadrant 34 rotate about the same axis, the rotational disposition of the optical attenuator 30 determining the amount of light energy passing through it. The drive quadrant 34 transmits signal information through appropriate stringed connections 35 which ride on its outer periphery and are affixed thereto. The drive strings 35 are one form of mechanical linkage which may be used to connect the optical attenuator 30 to the recorder 23 shown in Fig. 1. Accordingly, if the servomotor 19 oscillates at a 60-cycle frequency, the assembly comprising the optical attenuator 30 and the drive quadrant 34 will be driven in an oscillatory motion at 60 cycles about the center of rotation of shaft 33.

The present invention, however, contemplates means for compensating this unwanted movement of the attenuator, quadrant or any similar member. The assembly used in combination with the oscillating portion of the servo system may comprise a weight 36 as shown in Fig. 2 supported on a resilient member 37 affixed to the drive quadrant 34. The mass of the weight 36 is so related to the resilience of the supporting element 37 that the assembly has a natural frequency equal to the undesirable 60-cycle movement or any other alternating frequency which it is desired to suppress. The combination of the present invention therefore has the property of absorbing the unwanted movement at a given frequency so that it may be suppressed to a desired tolerance. At the same time, other elements of the mechanical portion of the system, such as the rotor of the motor 19 continue to possess the oscillatory movement, obviating the need for higher torque capabilities to overcome static friction which has been known to occur in bearings, gears, cams, and other mechanical linkages.

It is well known to those skilled in the art that undesirable 60-cycle jitter can be greatly reduced by avoiding passing direct current through the control winding to create a rate-proportional damping effect. This requires either a servo-motor having very fine response characteristics or additional error rate damping networks in the amplifier. Such motors are markedly more expensive, however, and additionally, because of the absence of oscillatory motion, there is the consequent requirement for higher torque capability to overcome static friction. Additional networks in the amplifier are complex and inherently limited in their effectiveness. The present invention makes it possible to produce comparable performance and results with a much less expensive servomotor-amplifier combination.

The system schematically illustrated in Fig. 3 shows an electromechanical servomechanism recorder loop as included in a spectrophotometer. A source 40 originates radiant energy which is reflected from a mirror 41 to two equidistant mirrors 42 and 43 forming sample and reference beams used for analysis purposes. The sample to be analyzed is placed in the sample area 44, and energy is absorbed from the sample beam in accordance with the particular properties of the sample being analyzed. By contrast, all the energies contained in the reference beam are transmitted. Both the sample beam and the reference beam are received in a photometer 45. An arrangement of mirrors 46, 47, and 48 brings the two beams together at a common point on a chopper 49 driven by a motor 50. The chopper alternately directs the sample beam and reference beam to a monochromator 51.

In the monochromator, particular wavelengths of the beams are successively scanned and emerge to be detected by a radiation-sensitive detector 52. The detected signal contains an alternating component of a frequency determined by the chopping frequency (which, in a typical instance, may be 13 c.p.s.), and having an amplitude commensurate with the instantaneous difference in amplitude between the reference and the sample beams. The detected signal is amplified in an amplifier 53 and rectified in a synchronous rectifier 54 which is actuated at the chopping frequency by the same motor 50 which drives the chopper 48. The D.C. output of the synchronous rectifier 54 is filtered in a D.C. filter 55, converted to a 60-cycle modulated signal and amplified by appropriate circuitry 56.

The amplified 60-cycle signal is employed to actuate a servomotor 57 which drives the optical wedge 58 into the reference beam so as to maintain a state of balance between the sample beam and the reference beam. The over-all system, therefore, provides an output signal which is commensurate with the instantaneous deviation of the movable wedge 58 from the position which is necessary to maintain the desired loop condition, i.e., a state of balance between the two beams. The optical wedge 58 is mechanically linked to a recorder and its movement thus recorded as an indication of a difference in intensity between the sample and reference beams. The motor 60 causes the monochromator to scan through successive wavelengths and also drives the recorder drum 59 so that the intelligence recorded as ordinate amplitude is related to wavelength along the abscissa.

Figure 4:
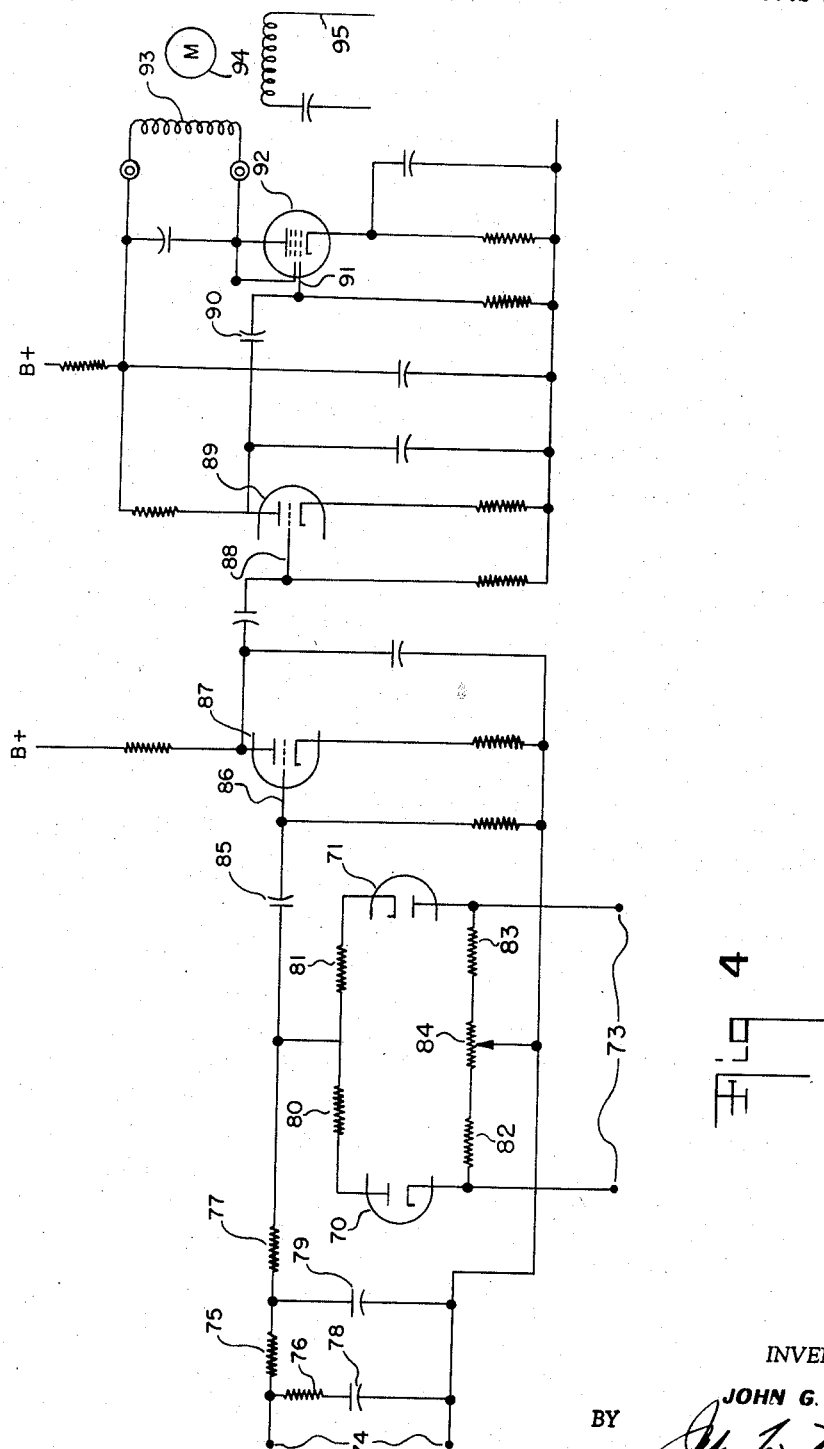
Fig. 4 is a schematic wiring diagram of the electrical drive portion of an electromechanical servomechanism loop embodying the present invention.

Fig. 4 illustrates the optical portion of the system which provides the 60-cycle signal to actuate the servomechanism drive motor 57 as shown at 57 and 53. Twin diodes 70 and 71 have a 60-cycle reference voltage impressed upon them across terminals 73. The D.C. signal, such as would be produced by the synchronous rectifier of the system of Fig. 1 or Fig. 3 is impressed across input terminals 74 and filtered by a network of resistors 75, 76 and 77 and capacitors 78 and 79. The filtered D.C. signal is impressed across both diodes 70 and 71 through resistors 80 and 81, 82 and 83. A common variable tap resistor 84 provides a means by which the diode circuits may be balanced. Each of the diodes 70 and 71 is conductive only during the half cycle of the reference 60-cycle signal when its plate is positive and its cathode negative. Thus, during one half of each alternation of the 60-cycle reference signal, either diode 70 or 71 is conductive, dependent upon the polarity of the input signal impressed across input terminals 74. The diode circuit is therefore in effect an electronic switch operating at 60 cycles per second. The resultant output is a signal which alternates at 60 cycles per second, having a peak amplitude equal to the input D.C. signal and a phase determined by the polarity of the D.C. input signal.

This 60-cycle A.C. signal is fed through a coupling capacitor 85 to the grid 86 of a triode amplifier 87. The output at the plate of amplifier 87 is fed to the grid 88 of a similar triode amplifier 89 whence it is connected through a coupling capacitor 90 to the grid 91 of a pentode amplifier 92. The plate output of the power amplifier 92 appears across a winding 93 which is part of a servomotor 94. Being series-connected in the plate circuit of the power amplifier 92, the winding 93 therefore carries a combined A.C.-D.C. signal. The other winding 95 of the servomotor 94 is energized with a 60-cycle signal and the rotor of servomotor 94 is actuated to an extent and in a direction commensurate with the amplitude and phase, respectively, of the A.C. signal component appearing across winding 93.

The electronic circuit illustrated in Fig. 4 is reliable, convenient, and relatively inexpensive but, unless a high-performance, comparatively expensive servomotor is used and the D.C. component of the control signal diverted from its control winding, a 60-cycle oscillation jitter will result. The circuit, however, may be used in combination with the present invention which suppresses undesirable mechanical movement or oscillatory motion at a known or determinable frequency, such as this type of 60-cycle oscillation.

It will be evident to those skilled in the art that the damper assembly of the present invention need not be used with a mechanically rotatable device nor is the present invention inherently limited to use with a recorder servomechanism loop, although it affords especial advantages in such an application. For example, the present invention may be embodied in the servo-mechanism loops of strip chart as well as drum type or rotary chart recorders. Meters and other types of visual indicators having mechanically moving parts can also be adapted to suppress unwanted movement in accordance with the teaching of the present invention.

The concept of the present invention contemplates its use with any electromechanical system where it is desired to suppress unwanted movement in the mechanical portion of the system. The present invention may be employed with good results in any system where the mechanical movement has a known or determinable cyclic rate. Its use can enhance performance and eliminate the need for expensive components in a servomechanism loop.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A servomechanism loop comprising means for producing an error signal commensurate with the instantaneous deviation of a movable member from a position necessary to maintain a desired closed loop condition, means for converting said error signal to an alternating frequency, positioning means adapted to respond to said error signal for correcting the deviation of said member from said desired condition, and means for compensating unwanted movement of said member, said last-named means being operably responsive to movement of said positioning means and including a weight supported on a resilient element, the mass of said weight being so related to the resilience of its supporting element that the assembly has a natural frequency equal to said alternating frequency.

2. A servomechanism loop comprising means for producing an error signal commensurate with the instantaneous deviation of a movable member from a position necessary to maintain a desired closed loop condition, means for converting said error signal to an alternating frequency, means responsive to said alternating error signal for positioning said member to correct the deviation from said desired condition, and means for compensating unwanted movement of said member at the alternating frequency, said last-named means including an assembly of a weight supported on a resilient element mounted on said member, the mass of said weight being so related to the resilience of its supporting element that the assembly has a natural frequency equal to said alternating frequency.

3. A servomechanism loop comprising means for producing an error signal commensurate with the instantaneous deviation of a rotatable member from a position necessary to maintain a desired closed loop condition, means for converting said error signal to an alternating frequency, means responsive to said alternating error signal for positioning said rotatable member to correct the deviation from said desired condition, and means for compensating unwanted oscillatory movement of said member about its center of rotation at the alternating frequency, said last-named means including an assembly of a weight supported on a resilient element radially mounted on said rotatable member, the mass of the weight being so related to the resiliency of its supporting element that the assembly has a natural frequency equal to said alternating frequency.

4. A servomechanism loop comprising means for producing an error signal commensurate with the instantaneous deviation of a movable member from a position necessary to maintain a desired closed loop condition, means for modulating a carrier frequency in accordance with said error signal, means responsive to said modulated signal for positioning said member to correct the deviation from said desired condition, and means for compensating unwanted movement of said member at the carrier frequency, said last-named means including an assembly of a weight supported on a resilient element mounted on said member, the mass of said weight being so related to the resilience of its supporting element that the assembly has a natural frequency equal to said carrier frequency.

5. A servomechanism loop comprising means for producing an error signal commensurate with the instantaneous deviation of a movable member from a position necessary to maintain a desired closed loop condition, means for chopping said signal at a constant frequency, means responsive to said chopped error signal for positioning said member to correct the deviation from said desired condition, and means for compensating unwanted movement of said member at the chopping frequency, said last-named means including an assembly of a weight supported on a resilient element affixed to said member, the mass of said weight being so related to the length and resilience of its supporting element that the assembly has a natural frequency equal to the chopping frequency.

6. A servomechanism system for a null-type apparatus including means for detecting deviation from a state of null and producing an error signal as a function thereof, means for converting said error signal to an alternating frequency, drive means connected to receive said alternating error signal and respond thereto for correcting deviation from a state of null, said drive means being subject to unwanted movement at said alternating frequency, and means operably connected with said drive means for compensating said unwanted movement, said means including an assembly of a weight supported on a resilient member, the mass of said weight being so related to the resilience of its supporting member that the assembly has a natural frequency equal to said alternating frequency.

7. A servomechanism system including means for producing an error signal commensurate with the deviation of a movable member from a position necessary to maintain a desired closed loop condition, means for converting said error signal to an alternating frequency, servomotor means operably connected to position said movable member, said motor having a control winding connected to receive the same frequency as said error signal and related to it in amplitude, and means for compensating unwanted fluctuation of said system due to oscillation of said motor at the frequency of its input signals, said means including an assembly of a weight supported on a resilient member, the mass of said weight being so related to the resilience of its supporting member that the assembly has a natural frequency equal to said unwanted fluctuation.

8. A servomechanism system including means for producing an error signal commensurate with the deviation of a movable member from a position necessary to maintain a desired closed loop condition, means for converting said error signal to an alternating frequency, amplifier means having an input circuit connected to receive said alternating error signal, a servomotor operably connected to position said movable member, said motor having a control winding connected in the output circuit of said amplifier and a reference winding connected to an A.C. source of the same frequency, and means for suppressing unwanted fluctuation of a mechanically linked element of the system, said means including a weight supported on a resilient member, the mass of said weight being so related to the resilience of its supporting member that the assembly has a natural frequency equal to said unwanted fluctuation.

9. A servomechanism system including means for producing an error signal commensurate with the deviation of a movable member from a position necessary to maintain a desired closed loop condition, means for converting said error signal to an alternating frequency, electron tube amplifier means having its grid circuit connected to receive said alternating error signal, a servomotor operably connected to position said movable member, said motor having a control winding serially connected in the plate circuit of said electron tube amplifier, and a reference winding connected to an A.C. source of the same frequency, and means for suppressing unwanted fluctuation of a mechanically linked element of the system, said means including a weight supported on a resilient member, the mass of said weight being so related to the resilience of its supporting member that the assembly has a natural frequency equal to said unwanted fluctuation.

10. A servomechanism system including means for producing an error signal commensurate with the deviation of a movable member from a position necessary to maintain a desired closed loop condition, means for converting said error signal to an alternating frequency, amplifier means having an input circuit connected to receive said alternating error signal, a servomotor operably connected to position said movable member, said motor having a control winding connected in the output circuit of said amplifier and a reference winding connected to an A.C. source of the same frequency, said output circuit being such that there is substantial flow of D.C. current in said control winding, and means for suppressing unwanted fluctuation of a mechanically linked element of the system, said means including a weight supported on a resilient member, the mass of said weight being so related to the resilience of its supporting member that the assembly has a natural frequency equal to said unwanted fluctuation.

No references cited.